US009094212B2

(12) United States Patent
Thomas et al.

(10) Patent No.: US 9,094,212 B2
(45) Date of Patent: Jul. 28, 2015

(54) MULTI-SERVER AUTHENTICATION TOKEN DATA EXCHANGE

(75) Inventors: Robin Michael Thomas, Kirkland, WA (US); Christopher Michael Simison, Denver, CO (US); Naresh Sundaram, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 215 days.

(21) Appl. No.: 13/252,795

(22) Filed: Oct. 4, 2011

(65) Prior Publication Data

US 2013/0086381 A1    Apr. 4, 2013

(51) Int. Cl.
| | |
|---|---|
| G06F 7/04 | (2006.01) |
| H04L 9/32 | (2006.01) |
| G06F 21/00 | (2013.01) |
| G06F 15/16 | (2006.01) |
| G06F 15/173 | (2006.01) |
| H04L 29/06 | (2006.01) |
| G06F 21/31 | (2013.01) |

(52) U.S. Cl.
CPC .......... *H04L 9/3234* (2013.01); *H04L 63/0807* (2013.01); *G06F 21/31* (2013.01); *H04L 63/0428* (2013.01); *H04L 63/08* (2013.01); *H04L 63/083* (2013.01); *H04L 63/0815* (2013.01); *H04L 63/108* (2013.01)

(58) Field of Classification Search
CPC ........ H04L 63/08; H04L 63/083; G06F 21/31
USPC ................ 713/168, 182; 726/5; 709/219, 225
See application file for complete search history.

(56) References Cited

U.S. PATENT DOCUMENTS

| | | |
|---|---|---|
| 7,137,006 B1 | 11/2006 | Grandcolas |
| 7,404,204 B2 | 7/2008 | Davenport |
| 2003/0033535 A1 | 2/2003 | Fisher et al. |
| 2003/0126441 A1 | 7/2003 | Laux |
| 2004/0073796 A1* | 4/2004 | Kang et al. ..................... 713/171 |
| 2004/0243811 A1* | 12/2004 | Frisch et al. ................... 713/176 |
| 2010/0017596 A1 | 1/2010 | Schertzinger |
| 2010/0017859 A1 | 1/2010 | Kelly |

(Continued)

OTHER PUBLICATIONS

"Multi-server Session-based Authentication (Single Sign-on)", retrieved on: Aug. 9, 2011, from http://publib.boulder.ibm.com/infocenter/domhelp/v8r0/index.jsp?topic=/com.ibm.help.domino.admin85.doc/H_ENABLING_SINGLE_SIGN_ON_FOR_DOMINO_AND_WEBSPHERE_SERVERS_STEPS.html.

*Primary Examiner* — Aravind Moorthy
(74) *Attorney, Agent, or Firm* — Louise Bowman; Jim Ross; Micky Minhas

(57) ABSTRACT

A client is authenticated by a server receiving an initial request from the client at the beginning of a session. The server receiving the initial request generates an authentication token and returns the authentication token to the client in response to the client being authenticated. The user's credentials used to authenticate the client are stored in the authentication token along with other information. After receiving the authentication token from the server that generated the authentication token, the client passes the authentication token with each of the future requests to the pool of servers. Using the client to pass the transferrable authentication token, the servers share the user's identity/credentials in a decentralized manner. Any server from the shared pool of servers that receives a subsequent client request is able to decrypt the token and re-authenticate the user without having to prompt the client for authentication credentials again.

20 Claims, 4 Drawing Sheets

(56) References Cited

U.S. PATENT DOCUMENTS

| | | |
|---|---|---|
| 2010/0146611 A1 | 6/2010 | Kuzin |
| 2011/0283110 A1* | 11/2011 | Dapkus et al. ................ 713/182 |
| 2011/0321146 A1* | 12/2011 | Vernon et al. .................... 726/7 |

* cited by examiner

MULTI-SERVER AUTHENTICATION TOKEN DATA EXCHANGE

BACKGROUND

Many Internet services employ a pool of servers to process user requests. A client may initially be authenticated by a first server, but a future request from the client may end up on a different server that has not authenticated the client. As a result, the different server may re-authenticate the client by requesting authentication credentials once again from the user or the server may route the request to the first server that originally authenticated the client.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A client is authenticated by a server receiving an initial request from the client at the beginning of a session. The server receiving the initial request generates an authentication token and returns the authentication token to the client in response to the client being authenticated. Any server within the pool of servers that receives the initial request from the client can authenticate the client and generate the authentication token. The user's identity information used to authenticate the client are stored in the authentication token along with other information. After receiving the authentication token from the server that generated the authentication token, the client automatically passes the authentication token with each of the future requests to the pool of servers. Using the client to pass the transferrable authentication token, the servers share the user's identity information in a decentralized manner. Any server from the shared pool of servers that receives a subsequent client request is able to decrypt the token using a shared secret and re-authenticate the user without having to prompt the client for authentication credentials again.

DETAILED DESCRIPTION

Figure 1:
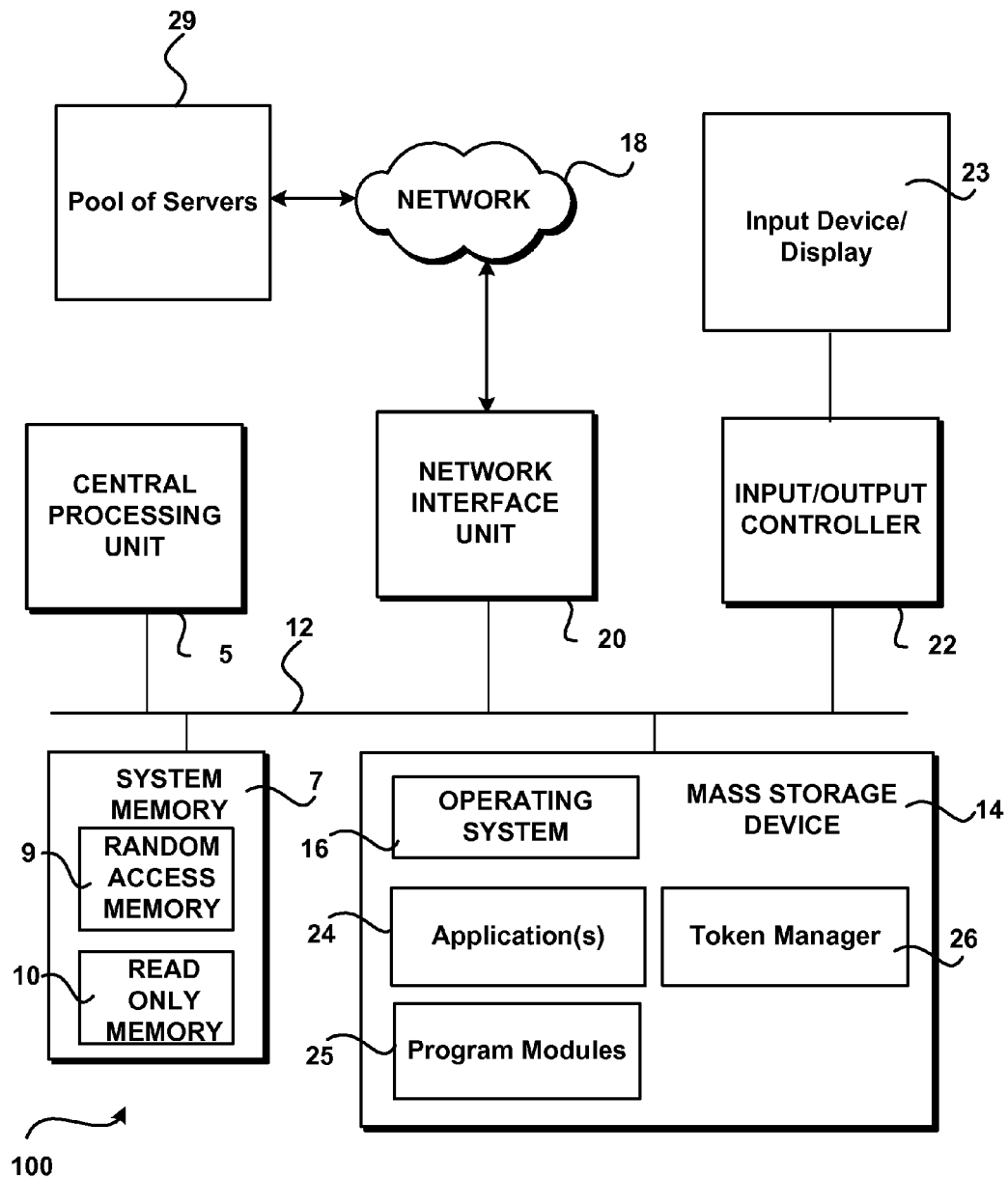
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a server, a desktop, a mobile computing device (e.g. phone, tablet, netbook, laptop), or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, program modules 25, and token manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, a touch input device, or electronic stylus (not shown in FIG. 1). Similarly, an input/output controller 22 may provide input/output to a display screen 23, a printer, or other type of output device.

A touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a computer, such as the WINDOWS SERVER®, WINDOWS 7®, or WINDOWS PHONE 7® operating system from MICROSOFT CORPORATION of Redmond, Wash. The mass storage device 14 and RAM 9 may also store one or more program modules. In particular, the mass storage device 14 and the RAM 9 may store one or more application programs.

Token manager 26 is configured to generate an authentication token for a client that may be used by any server within a pool of servers 29 to authenticate the client without requesting a user to re-enter authentication credentials. Token manager 26 may be located externally from an application, e.g. application 24, as shown, or may be a part of an application. Further, all/some of the functionality provided by token manager 26 may be located internally/externally from a messaging application. More details regarding the token manager are disclosed below.

Figure 2:
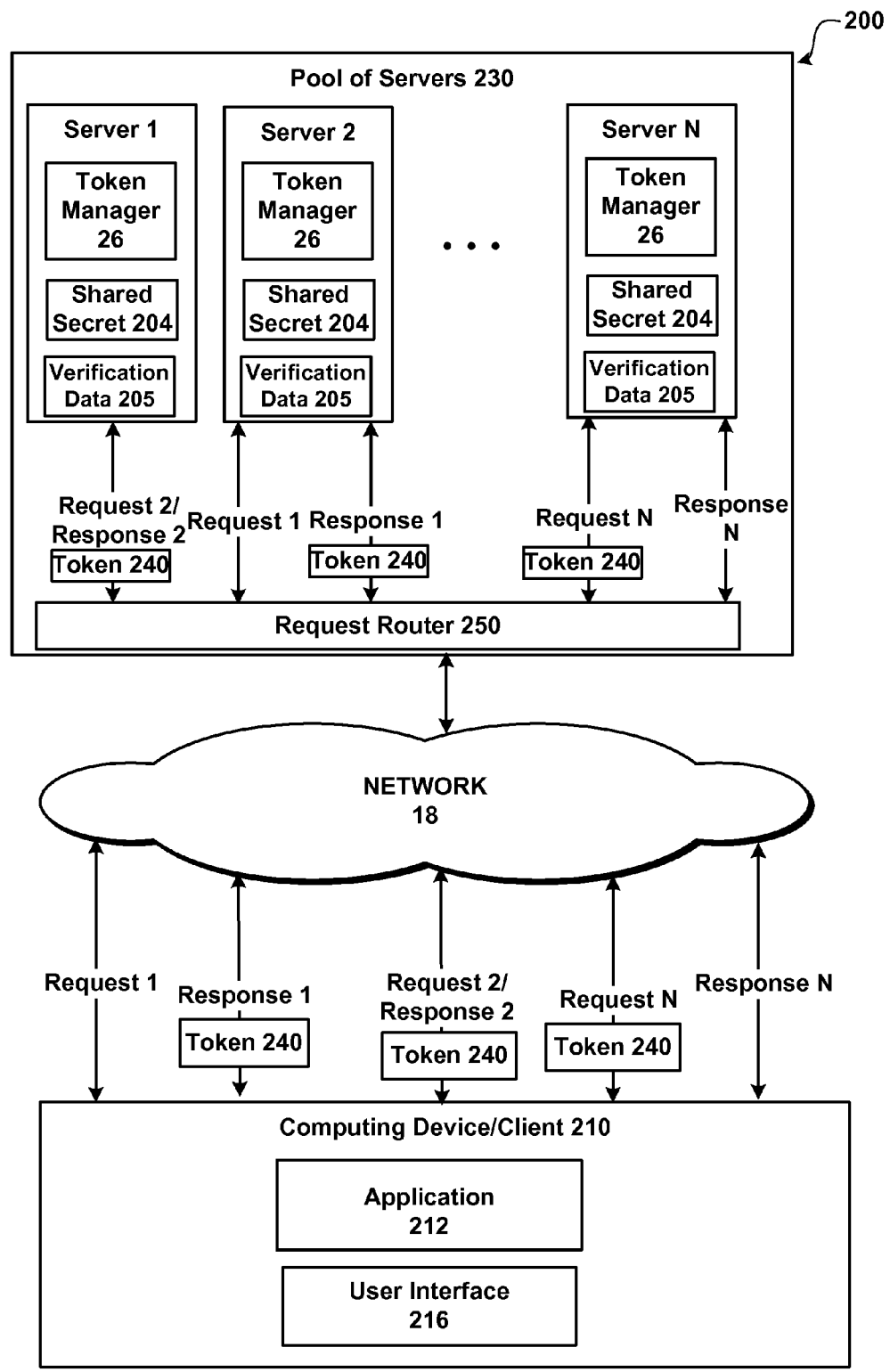
FIG. 2 shows a system for generating an authentication token for a client at a first server and receiving the authentication token from the client at different servers within a pool of servers that is used to authenticate the client.

FIG. 2 shows a system for generating an authentication token for a client at a first server and receiving the authentication token from the client at different servers within a pool of servers that is used to authenticate the client. As illustrated, system 200 includes computing device 210, pool of servers 230 and network 18. Pool of servers 230 comprises N servers, where N may be any number of servers and a request router 250 that may be implemented using software or hardware or a combination of hardware/software. Each of the N servers comprises the functionality of a computing device (e.g. computing device 100) and includes the functionality of token manager 26, a shared secret 204, and possibly verification data 205. Computing device 210 comprises an application 212 and optionally a user interface 216.

The computing devices may be any type of computing device that is configured to perform the operations relating to authentication of a client using an authentication token. For example, some of the computing devices may be: servers that are arranged to perform a particular service, mobile computing devices (e.g. cellular phones, tablets, smart phones, laptops, and the like); desktop computing devices and the like. Some computing devices may be arranged to provide an online service, some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 210 and pool of servers 230.

Computing device 210 includes application 212 and user interface 216. As illustrated, computing device 210 is used by a user to interact with pool of servers 230. User interface (UI) 216 is used to interact with an application, such as application 212. One or more user interfaces of one or more types may be used to interact with the application and information relating to the application. For example, UI 216 may include the use of a context menu, a menu within a menu bar, a menu item selected from a ribbon user interface, a graphical menu, and the like. Generally, UI 216 is configured such that a user may generate/send/receive requests and responses from pool of servers 230. For example, a user may simply select an option within UI 216 to log onto a service provided by the pool of servers. Application 212 may also communicate with the pool of servers without the use of the user interface 216.

Application 212 may be a client based application, such as an office productivity application (e.g. word processor/spreadsheet/presentation/messaging application) and/or some other type of application.

Pool of servers 230 may be used to process requests received from clients, such as computing device 210. Each of the servers within the pool of servers is configured with functionality of token manager 26, a shared secret 204 (e.g. SSL certificate) and may include verification data 205 that is used to verify the authenticity of the data that is contained within the token.

Token manager 26 is configured to generate and process authentication tokens that are associated with clients. Once a client is authenticated by a server within the pool of servers, the client is authenticated with each of the servers within the pool of servers without having to re-enter authentication credentials.

The following example is for illustrative purposes and is not intended to be limiting. Client 210 sends Request 1 to pool of servers 230 that is received by request router 250. Request router 250 may route the request to any one of the pool of servers to handle the request. For example, request router 250 may employ one or more routing schemes to distribute the requests over the N servers in the pool of servers 230. Since Request 1 is the first request received by the pool of servers, the server initially receiving the request (Server 2) from the client authenticates the client. During the initial authentication of the client, server 2 may request authentication credentials from client 210. For example, Server 2 may request a username/password combination and/or other information that is used to authenticate the client. In response to authenticating the client, Server 2 generates an authentication token and returns the authentication token to the client. Any server within the pool of servers 230 that initially receives the request from the client can authenticate the client and generate the authentication token.

The authentication token stores the user's identity information along with other information. For example, the user's identity information could include a user identifier used by one/more applications, the authentication credentials (e.g. username/password) that was entered by the user for authentication, as well as other identifying information. According to an embodiment, the authentication token also stores information relating to the algorithm used to encrypt at least a portion of the content associated with the token, a time out value (TTL) and a verification signature.

The time out value is used to specify a time for how long the authentication is valid. The time out value may change depending on the client and/or the client computing device. For example, a client that is a public computing device may have a time out value that is a length of a typical session (e.g. 30 minutes, 1 hour, 2 hours . . . ) whereas a client that is a private computer may have a timeout value of a much longer period (e.g. 8 hours, 12 hours . . . ).

The verification data 205 is used by a server in the pool of servers that receives a subsequent request from the client that includes the authentication token to determine if the token is valid. According to an embodiment, the verification data is data (e.g. a string of characters) that each server knows. For example, the server may use shared secret 204 to decrypt the token to determine if the verification data within the token matches the stored verification data 205.

After receiving the authentication token from the server that generated the authentication token, client 210 passes the authentication token with each of the future requests (e.g. Request 2 to Request N) it makes to the pool of servers. Using the client to pass the transferrable authentication token, the servers in the pool of servers share the user's identity/credentials and other information in a decentralized manner. Any server from the shared pool of servers that receives a subsequent client request is able to decrypt the authentication token using the shared secret and re-authenticate the user without having to prompt the client for authentication credentials again. For example, when client sends Request 2 to pool of servers 230, Server 1 receives Request 2 and uses a shared secret (e.g. a secret key and initialization vector) to decrypt the authentication token to verify that client 210 is authenticated. According to an embodiment, Server 1 also checks the received authentication token to determine that it contains data that matches the verification data 205 that is stored by each of the servers to determine that the authentication token is genuine. Server 1 may also check the time out value to ensure that the token is still valid when it was received. After authenticating the client using the authentication token, Server 1 processes the request and returns Response 2 that includes the authentication token. Server 1 may/may not update the information stored within the authentication token. For example, Server 1 may add state information to the authentication token that may be used by the server to share information with the other servers in the pool of servers. For each subsequent request made by a client to the pool of servers, the authentication is included within the request. The authentication token 240 may/may not be included in each subsequent response that is received from a server. For example, the token may be included in the request and response as illustrated in Request 2/Response 2 or the token may only be included in subsequent requests as illustrated by Request N and not included in the response to Request N.

Figure 3:
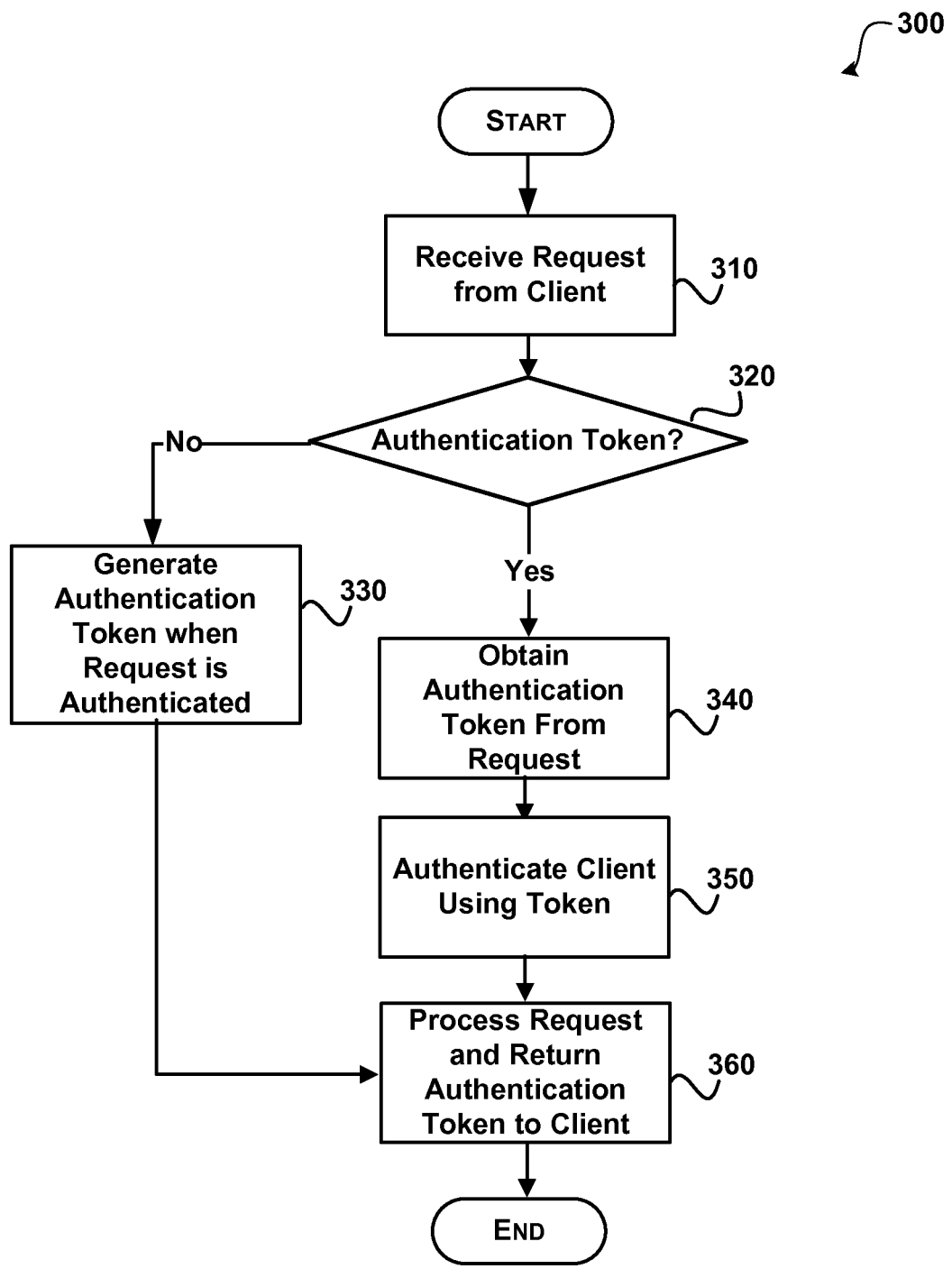
FIG. 3 shows a process for generating and using a received authentication token for authenticating a client.
Figure 4:
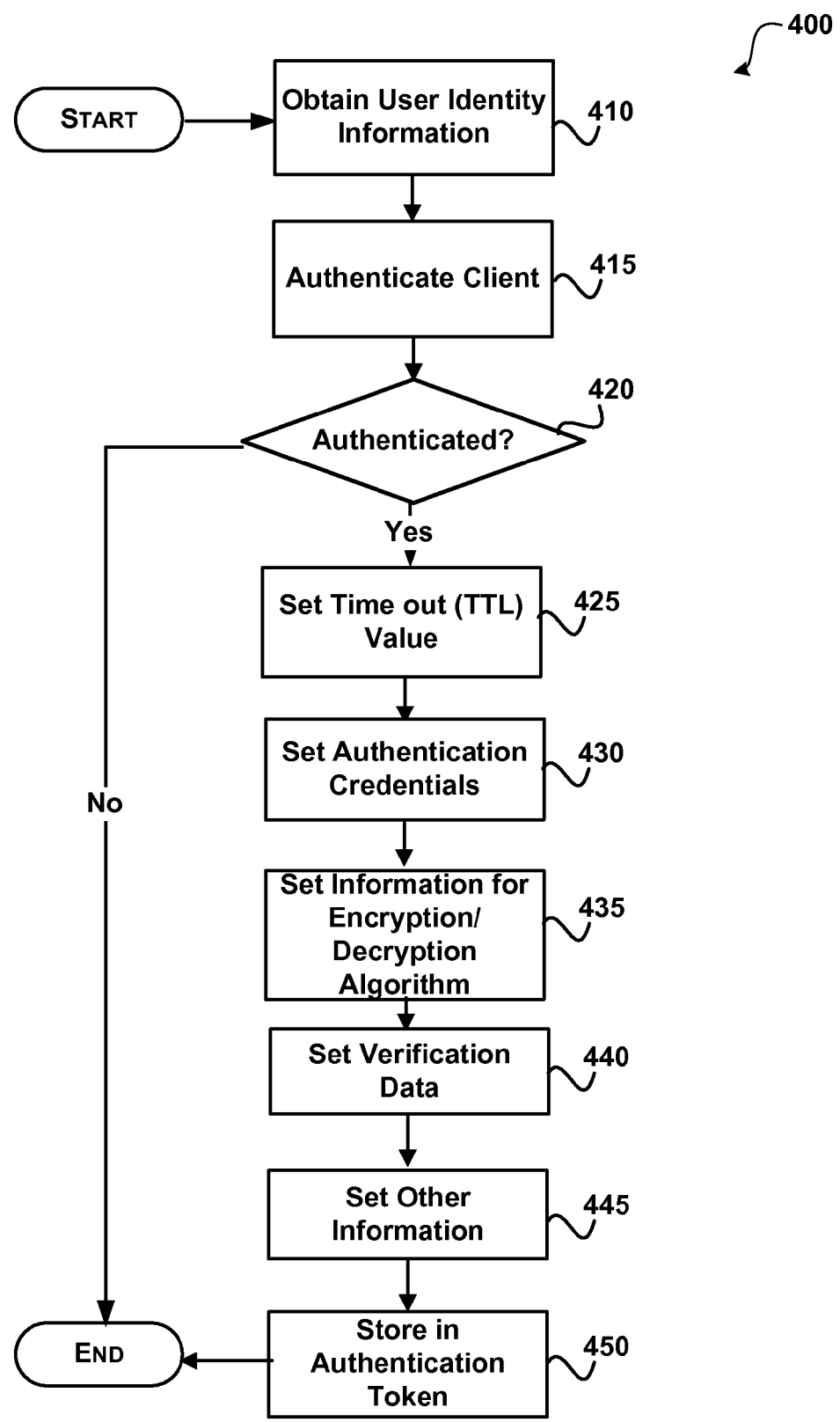
FIG. 4 shows a process for generating an authentication token for a client.

FIGS. 3 and 4 show an illustrative process for generating and authenticating tokens. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance and/or security requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 shows a process for generating and using a received authentication token for authenticating a client.

After a start block, process 300 moves to operation 310, where a request is received from a client at a server. The request may be received by any of the server in the pool of servers.

Flowing to operation 320, a decision is made as to whether an authentication token is included with the request that is received by the server. When there is not an authentication token, the process flows to operation 330. When there is an authentication token that is included with the request, the process flows to operation 340.

At operation 330, an authentication token is generated for the client when the request is authenticated. If the client is not authenticated, then the process would end and there would not be an authentication token generated. Generally, the authentication token is generated by the server that initially receives a request from the client and requests authentication credentials from the client for authentication (See FIG. 4 for more details regarding generating the authentication token). The generated authentication token is used in subsequent requests by the client such that the client does not need to provide authentication credentials again.

At operation 340, the authentication token is obtained from the received request. When an authentication token is included with the request then the client has already been authenticated by a server within the pool of servers. The authentication of the client could have been performed by the server receiving the request and/or any of the other servers in the pool of servers.

Moving to operation 350, the client is authenticated using the received authentication token. Different methods may be used to authenticate the client using the received authentication token. For example, the user's credentials may be obtained from the authentication token to verify the authenticity of the client. Additional verification data (e.g. information known to each of the servers in the pool of servers) may also be used to verify the authenticity of the token. For example, the verification data may be checked to help ensure that the content of the authentication token has not been altered. Other methods may also be used. For example, more/fewer authentication processes may be performed depending on a desired security. Instead of requesting additional authentication credentials from the user, the authentication is performed using information identified by/included with the authentication token.

Transitioning to operation 360, the server processes the request and returns the authentication token to the client with the response.

The process then flows to an end block and returns to processing other actions.

FIG. 4 shows a process for generating an authentication token for a client.

After a start block, process 400 moves to operation 410, where identity information and/or authentication credentials are obtained from the client. The identity information requested may vary from service to service. For example, a request may be made for a user to enter a name and a password and/or other identifying information.

Flowing to operation 415, the obtained information (e.g. authentication credentials) are used to authenticate the client.

Moving to decision operation 420, a decision is made as to whether the provided information authenticated the client. When the client is not authenticated, the process may return to obtain correct authentication credentials and/or move to an end operation. When the client is authenticated, the process flows to operation 425.

Transitioning to operation 425, a time out value is set. The time out value (TTL) is used to specify a time for how long the authentication that is associated with the authentication token for the client is valid. According to an embodiment, the time out value is set based upon a security that is associated with the client computing device. For example, a client that is a public computing device (e.g. in a public place, kiosk, . . . ) has a time out value that is a length of a typical session (e.g. 30 minutes, 1 hour, 2 hours . . . ). A more secure client computer, such as a private/work computer has a longer timeout value (e.g. 8 hours, 12 hours . . . ). According to an embodiment, the timeout value is configurable by an authorized user (e.g. an administrator of the pool of servers).

Flowing to operation 430, authentication credentials are set. The authentication credentials may include the information entered for authentication (e.g. username/password) and/or more/less information may be included. For example, other identifying information may also be included such as: a client/user identifier; a tenant identifier for the user; one or more application(s) authorized by the authentication; and the like.

Moving to operation 435, information for the encryption/decryption algorithm is set. According to an embodiment, a symmetric algorithm is used for encryption/decryption of content stored in the authentication token. Generally, when using a symmetric algorithm each computer that encrypts/decrypts data uses the same secret key and initialization vector for encryption/decryption. According to an embodiment, the secret key and the initialization vector are obtained with the distribution of the authentication token. To communicate the symmetric key and initialization vector, the secret key and the initialization vector are encrypted using asymmetric encryption. For example, a public/private key may be used to encrypt/decrypt the secret key and initialization vector such that the secret key and the initialization vector may be provided to the server receiving the request with the authentication token. Other types of encryption/decryption may be used. Generally, any encryption/decryption method may be used that meets the specified security constraints. According to an embodiment, a new secret key and initialization vector is created for each new session.

Transitioning to operation 440, verification data is optionally set. The verification data is used by a server in the pool of servers that receives a subsequent request from the client that includes the authentication token to determine if the token is valid. According to an embodiment, the verification data is common data, such as a string of characters that each server knows.

Flowing to operation 445, other information may be set. For example, state information, identity information, and the like may be set within the authentication token.

Moving to operation 450, the set information is stored in the authentication token. According to an embodiment, the set information is stored in a cookie that is transmitted back and forth between the client and the pool of servers. The information may be stored using other methods. For example, the information may be stored in a header of the request/response and/or in some other location.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for authenticating a client, comprising:
receiving a request from a client at any server within a pool of servers;
determining at the server that receives the request when the request includes an authentication token that is used to authenticate the client;
when the request does not include the authentication token, the server generating an authentication token in response to the client being authenticated by authentication credentials, wherein other servers within the pool of servers are enabled to authenticate the client based on the authentication token issued by the server;
when the request does include the authentication token, the server performing actions, comprising:
obtaining the authentication token from the request;
comparing data obtained from within the authentication token to verification data that is stored by each of the servers in the pool of servers to determine when the authentication token is valid;
authenticating the client based on information associated with the authentication token; and
returning the authentication token to the client, wherein the authentication token is received from the client at any one of the servers within the pool of servers in future requests.

2. The method of claim 1, wherein the authentication token comprises encryption information used in encrypting/decrypting data that is associated with the authentication token.

3. The method of claim 2, wherein the encryption information comprises a session key and an initialization vector that is associated with a symmetric algorithm.

4. The method of claim 2, wherein the authentication token further comprises a time out value that specifies a time period for which the authentication is valid that changes depending on a security level of the client.

5. The method of claim 2, wherein the authentication token further comprises a verification signature.

6. The method of claim 1, wherein the authentication token is encrypted using an asymmetric algorithm that comprise at least a portion of information that is encrypted using a symmetric algorithm.

7. The method of claim 1, wherein the authentication credentials comprise content received from a user of the client that is used to authenticate the client.

8. The method of claim 1, wherein the authentication token stores state information relating to a session of the client.

9. The method of claim 1, wherein the generating the authentication token comprises a client identification and a tenant identification.

10. The method of claim 1, wherein each server of the pool of servers uses the authentication token received from a client without storing a shared state between the servers.

11. A system for authenticating a client, comprising:
a network connection that is configured to connect to a network;
a processor, memory, and a computer-readable storage medium;
an operating environment stored on the computer-readable storage medium and executing on the processor; and
a token manager operating in conjunction with the operating environment that is configured to perform actions comprising:
receiving a request from a client at any server within a pool of servers;
determining at the server that receives the request when the request includes an encrypted authentication token that comprises information entered by a user to be authenticated;
when the request does not include the authentication token, the server generating an authentication token in response to receiving information entered by a user to be authenticated and authenticating the client based on the received information, wherein other servers within the pool of servers are enabled to authenticate the client based on the authentication token generated by the server;
when the request does include the authentication token, the server performing actions, comprising:
obtaining the authentication token from the request;
comparing data obtained from within the authentication token to verification data that is stored by each of the servers in the pool of servers to determine when the authentication token is valid;
authenticating the client based on information associated with the authentication token including the information previously entered by the user to be authenticated; and
returning the authentication token to the client, wherein the authentication token is received from the client in future requests.

12. The system of claim 11, wherein the authentication token further comprises: a session key and an initialization vector that is associated with a symmetric algorithm; and a time out value that specifies a time period for which the authentication is valid.

13. The system of claim 12, wherein the authentication token further comprises a verification signature.

14. The system of claim 11, wherein the authentication token stores state information relating to a session of the client.

15. A system for authenticating a client within a pool of servers, comprising:
a receiving server, wherein the receiving server is any server in the pool of servers that receives an authentication request from a client and wherein the receiving server is operable to determine whether an authentication token is included in the authentication request;
when the authentication request is determined to not include the authentication token, the receiving server is operable to:
request identity information from the client;
authenticate the client on the receiving server based on the identity information;
when the client has been authenticated, generate an authentication token that includes identity information; and
send the authentication token to the client, to enable any server within the pool of servers to authenticate the client via the authentication token in future authentication requests;
when the authentication request is determined to include the authentication token, the receiving server is operable to:
determine the validity of the authentication token;
when the authentication token is determined to be valid, the receiving server is operable to obtain the identity information from the authentication token and to authenticate the client.

16. The system of claim 15, further comprising:
when the authentication token is determined to not be valid, the authentication request is treated as though the authentication token were not included in the authentication request.

17. The system of claim 15, wherein the authentication token further comprises a time out value that specifies a time period for which the authentication is valid.

18. The system of claim 15, wherein each server of the pool of servers uses the authentication token received from the client without storing a shared state between the servers.

19. The system of claim 15, wherein the authentication token stores state information relating to a session of the client.

20. The system of claim 15, wherein the pool of servers authenticate the client using the authentication token in future authentication requests without requesting the identity information from the client.

* * * * *